United States Patent
Ackermann

[15] 3,678,245
[45] July 18, 1972

[54] DEVICE FOR CLEANING THE WALLS OF THE MUFFLE CHAMBER OF BAKING AND ROASTING OVENS

[72] Inventor: Joseph Ackermann, Traunreut, Germany

[73] Assignee: Siemens Elektrogerate GmbH, Berlin and Munich, Germany

[22] Filed: Nov. 27, 1970

[21] Appl. No.: 93,364

Related U.S. Application Data

[63] Continuation-in-part of Ser. No. 843,947, June 20, 1969, abandoned.

[30] Foreign Application Priority Data

July 21, 1968 Germany.....................P 17 78 938.7

[52] U.S. Cl..............................219/396, 34/35, 126/21 A, 219/400, 219/371, 219/412
[51] Int. Cl......................................F27d 11/02, A21b 1/22
[58] Field of Search.................219/400, 279, 396, 397, 412, 219/413; 126/21 A; 34/35; 134/1, 22, 19, 20

[56] References Cited

UNITED STATES PATENTS

| | | |
|---|---|---|
| 2,164,265 | 6/1939 | Wilson..............................219/400 X |
| 2,795,054 | 6/1957 | Bowen.....................................34/35 |
| 2,862,095 | 11/1958 | Scofield............................219/396 X |
| 3,423,568 | 1/1969 | Meckley et al....................219/396 X |
| R26,943 | 8/1970 | Barber..................................219/413 |
| 3,529,582 | 9/1970 | Hurko................................219/400 X |

Primary Examiner—Volodymyr Y. Mayewsky
Attorney—Curt M. Avery, Arthur E. Wilfond, Herbert L. Lerner and Daniel J. Tick

[57] ABSTRACT

Device for cleaning the walls of the muffle chamber of an oven with heated atmosphere circulating in a closed system includes means for passing heated atmosphere into the muffle chamber through an outlet located in a side wall of the muffle chamber adjacent the bottom wall of the same.

2 Claims, 1 Drawing Figure

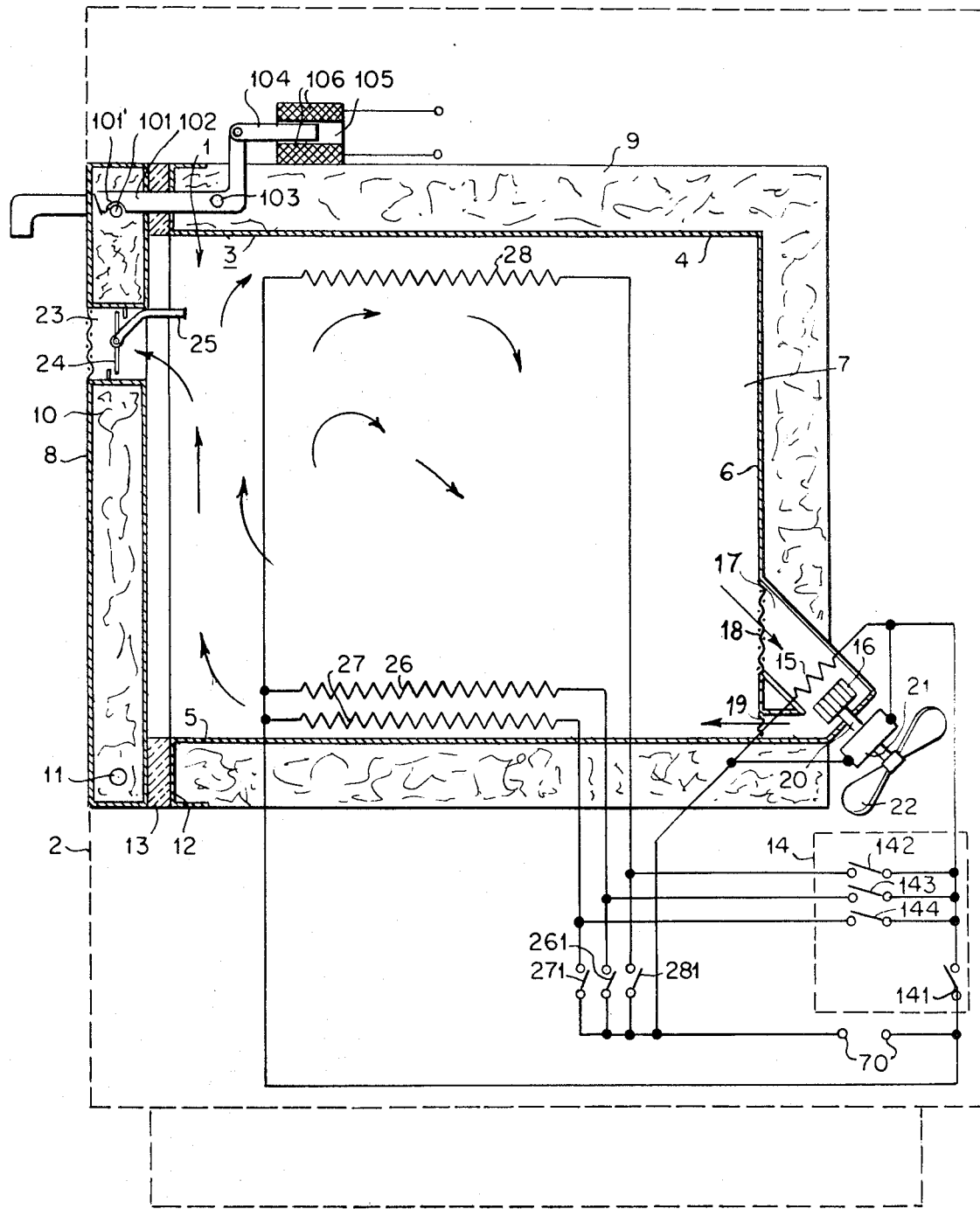

DEVICE FOR CLEANING THE WALLS OF THE MUFFLE CHAMBER OF BAKING AND ROASTING OVENS

This application is a continuation-in-part of my application Ser. No. 834,947, filed June 20, 1969 and now abandoned.

My invention relates to a device for cleaning the walls of a muffle chamber of baking and roasting ovens, particularly by employing an electric heating device for vaporizing or burning impurities adhering to the walls.

A method of this type is known for electric ranges wherein, by continuously supplying comparatively high heating energy which is provided by electric heating elements, the muffle walls are heated so strongly that the residues adhering thereto are vaporized and burned. This method, the so-called automatic or self-cleaning method is carried out at temperatures between 450° and 570° C. The vapor produced from the vaporizing or burning of the residues is fed to an afterburner connected downstream of the baking and roasting oven and discharged therefrom into the surroundings. The vapor escaping from the afterburner sometimes has a strong pungent odor, however, which is felt to be a shortcoming of this known method.

It is further known to avoid this disadavantage by providing an oven with a muffle chamber which is tightly closed during the cleaning process. In this known device an air guide including a blower and a heating resistor, is located below the bottom wall of the muffle chamber and connects an inlet with an outlet that are both located in the bottom wall. During the cleaning process, the atmosphere in the muffle chamber is circulated through the air guide and thereby heated to the desired temperature. In this known device, the bottom wall which is the most soiled part of the muffle chamber, is also the coolest part of the muffle chamber, and the cleaning effect is therefore unsatisfactory. In the device of the known art, cleaning of the inner surface of the door also causes difficulties because the temperature of the inner surface of the door is lower than that of the side walls.

It is accordingly an object of my invention to provide a device for cleaning the muffle walls of baking and roasting ovens in electric ranges and the like which avoids the foregoing disadvantages of the heretofore known devices.

More particularly, it is an object of my invention to provide such a device which assures that all parts forming the muffle chamber have a temperature that is as uniform as possible.

A further object of my invention is to provide an oven in which the heated and circulated atmosphere is guided so that the atmosphere at its hottest passes over the bottom of the muffle chamber.

Another object of my invention is to provide an oven in which the heated and circulated atmosphere is guided so that a flow of heated atmosphere is directed substantially perpendicularly against the lower part of the inside of the door.

With the foregoing and other objects in view, I provide in accordance with my invention, a baking and roasting oven with a muffle chamber having a top and a bottom wall and side walls formed with an admission opening closable by a door, the muffle chamber communicating with the surroundings through a vapor discharge outlet, a device for cleaning the walls of the muffle chamber comprising an inlet and an outlet to the muffle chamber located in a wall of the muffle chamber, the outlet being located in one of the side walls adjacent the bottom wall of the muffle chamber; an air guide located outside the muffle chamber and connecting the inlet and the outlet; the air guide including impeller means capable of impelling gas through the air guide from the inlet to the outlet and a heating element; locking means for locking the door in the closed position thereof, a flap located adjacent the vapor discharge outlet for closing the discharge outlet when the walls are being cleaned.

In accordance with another feature of the invention, I provide such baking and roasting oven with heating means for heating food to be processed therein, and means for energizing the heating means simultaneously with the impeller means, and the heating element in order to heat the atmosphere to a temperature between 450°C and 570°C.

In accordance with a further feature of the invention the means for energizing the heating means is adapted to raise the temperature thereof to incandescent temperature.

In accordance with yet another feature of the invention, the one sidewall in which the vapor discharge outlet is located, is opposite the door of the oven.

In accordance with another feature of my invention, during the heating step, when a given inner temperature of the oven is attained, a vapor discharge opening to the oven, is preferably automatically closed tightly. The blower provided in the oven for circulating the air-gas mixture atmosphere is advantageously temperature and/or time-dependently and automatically actuated and may also open the vapor discharge opening.

Other features which are considered as characteristic for the invention, are set forth in the appended claims.

Although the invention is illustrated and described herein as device for cleaning the walls of the muffle chamber of baking and roasting ovens, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description when read in connection with the accompanying single figure of the drawing, in which there is shown in vertical section and partly diagrammatically, device for cleaning the walls of the muffle chamber of a baking and roasting oven in electric ranges and the like according to my invention.

Referring now to the drawing, there is shown a baking and roasting oven 1 in the housing 2 of an electric range (in phantom view). The muffle chamber 3 of the oven 1 is defined by a top wall 4, a bottom wall 5 and four side walls of which only a rear wall 6, one of two lateral walls 7 and a front wall which includes a door 8, are shown in this figure. The muffle chamber 3 is surrounded by a thick-walled layer of insulation 9, which on the one hand keeps the heat produced by the temperatures occurring during the course of the cleaning process away from the housing 2 of the range and the adjoining walls and, on the other hand, minimizes heat losses. The door 8 of the baking oven is also provided with a thermal insulation layer 10 and is pivotable about a pivot axis 11 relative to the muffle chamber 3. In the closed condition of the door 8, as shown in the figure, the door is sealed by sealing strips 13 of suitable material, such as asbestos webbing, disposed on the face of the edges 12 of the door opening to the muffle chamber 3.

The door 8 is arrested in the closed position thereof by a latch or lock 102 which is pivotable on a pivot pin 103 fixed to a stationary wall of the muffle chamber 3, the latch being formed with a recess 101' in which a bar 101 fixed to the door 8 is receivable. A link 104 is pivotably connected to the latch 108 and extends in the form of an armature into a hollow interior 105 of a solenoid 106. When current is supplied to the solenoid, the link 104 is pulled farther into the hollow interior 105 of the solenoid 106, thereby unlocking or unlatching the door 8. Conventional circuitry (not shown) may be employed to permit the door to be unlocked only when the temperature in the muffle chamber is below a given safe value. An inlet 18 and an outlet 19 to the muffle chamber 3 are located in the side wall 6 opposite the door 8, the outlet 19 being situated adjacent the bottom wall 5 and especially at a level located within the lower third of the muffle chamber. Outside the muffle chamber 3, an air guide 17 is located, connecting the inlet 18 with the outlet 19, an impeller wheel 16 and a resistance 15 heatable to incandescent temperature being disposed within the air guide 17. The impeller wheel 16 is mounted on a shaft 20 extending into the air guide 17 and driven by a drive motor 21. An additional impeller wheel or fan blade 22 is mounted on the shaft 20 for producing an air current to cool the motor 21. Conventional heating resistances 26, 27 and 28 are located in the muffle chamber 3, each one being connected to a voltage supply 70 through a switch 261, 271 and 281, respectively; by means of these switches, various combinations of resistances can be electrically connected to the voltage supply, as may be found necessary.

The resistance 15 and the motor 21 connected in parallel therewith, are connected to the voltage supply through a switch 141 of a switching device 14 for energizing the resistance 15 and the motor 21 simultaneously with the heating resistances 26, 27 and 28. For this purpose, the switching device 14 includes further switches 142, 143 and 144 which are actuable simultaneously with the switch 141, and connect in their closed position, the resistances 26, 27 and 28 through switch 141 to the voltage supply independently of the on or off condition of the switches 261, 271 and 281, respectively. The switches 142, 143 and 144 may also be actuable independently of the actuation of the switch 141.

In carrying out the method of cleaning the muffle chamber walls from residues adhering thereto, the door 8 is closed and locked or latched and the resistances 15, 26, 27, 28 are energized and the motor 21 is switched on. The air present in the interior of the muffle chamber 3 is heated to a temperature at which the impurities on the walls are vaporized and, if need be, are also burned (cracked). The air is thereby continuously circulated while being constantly heated. During the heating process, when a predetermined temperature, preferably 300° C., is attained, a vapor discharge outlet 23 formed in the door 8, for example, is automatically closed by a flap 24 in the manner of a butterfly valve. At temperatures above 300° C., the flap 24 assumes the position shown in the figure. A bimetal strip 25 for registering the inner temperature of the muffle chamber 3 is shown diagrammatically in the figure as being connected to the flap 24 for pivoting the latter in accordance with the registered temperature. The bimetal strip 25 can be directly connected to the flap 24, as illustrated, so as to turn the latter about its pivot axis in accordance with the amount of bending produced in the bimetal strip by the muffle chamber temperature, or can be employed in any other conventional manner for turning the flap 24.

During the heating step, the muffle walls are heated to cleaning temperature between 450° C. and 570° C., in the course of which the air-gas mixture atmosphere contained in the muffle chamber can expand until a predetermined inner temperature of for example 300° C. is attained and the vapors formed accordingly can pass unhindered into the surrounding space. The odors produced thereby are not any stronger than for a normal baking and roasting operation. When this predetermined inner temperature is exceeded, the vapor discharge outlet is closed however, so that further discharge of vapors is cut off.

In accordance with the device of my invention, I provide a high temperature blower having a heating conductor or resistance element heatable to incandescent temperature disposed at the rear wall of the muffle chamber adjacent the floor of the chamber, for directing heated atmosphere into the chamber at a location adjacent the floor thereof. Consequently, the surface of the chamber floor is reliably heated to cleaning temperature. Thus, after the baking and roasting oven and the door opening thereto have been permitted to cool down, it will be found that the odoriferous substances that are produced and subsequently burned therein are virtually destroyed. The residues originally adhering the walls of the baking and roasting oven can be readily removed as dust, i.e., a black powder.

The impeller wheel 16 for producing the circulating air flow represented by the arrows in the muffle chamber 3, the heating resistance 15 and a common housing therefor, which incorporates the air guide 17, may be integrated in a single plug-in type structural or modular unit which is insertable as an accessory in corresponding mechanical and electrical insert or plug-in devices in one of the muffle chamber walls, preferably the rear wall 6.

I claim:

1. In a baking and roasting oven with a muffle chamber having a top and a bottom wall and side walls, one of the side walls being formed with an admission opening closable by a door, the walls and the door being backed by thermal insulation material, the muffle chamber communicating with the surroundings through a vapor discharge outlet and having therein electrical heating means for heating food to be processed therein, a device for cleaning the walls of the muffle chamber comprising an inlet and an outlet to said muffle chamber located in a wall of said muffle chamber, said outlet being located in another of the side walls located opposite the door; an air guide located outside the muffle chamber and connecting said inlet and said outlet; said air guide including impeller means capable of impelling gas through the air guide from the inlet to the outlet and an electrical heating element, locking means for locking the door in the closed position thereof, a flap located adjacent the vapor discharge outlet for closing the discharge outlet, and means for energizing the electrical heating means simultaneously with said impeller means and said heating element in order to heat the atmosphere in the muffle chamber to a temperature in the range of 450° to 570° C. when the walls are to be cleaned, the door being locked and said discharge outlet being closed when the temperature of the atmosphere in the muffle chamber is within said range, so as to prevent escape of the heated atmosphere from the muffle chamber.

2. Device according to claim 1 wherein said outlet is located adjacent the bottom wall of the muffle chamber.

* * * * *